(12) United States Patent
Sakaguchi et al.

(10) Patent No.: US 9,863,475 B2
(45) Date of Patent: Jan. 9, 2018

(54) BEARING UNIT

(71) Applicant: NSK LTD., Tokyo (JP)

(72) Inventors: Yuki Sakaguchi, Fujisawa (JP); Marcos Vilodres Campanha, Sao Paulo (BR); Anderson Jose Lemes Da Silva, Sao Paulo (BR)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/121,111

(22) PCT Filed: Feb. 20, 2015

(86) PCT No.: PCT/JP2015/054872
§ 371 (c)(1),
(2) Date: Aug. 24, 2016

(87) PCT Pub. No.: WO2015/129589
PCT Pub. Date: Sep. 3, 2015

(65) Prior Publication Data
US 2017/0016482 A1    Jan. 19, 2017

(30) Foreign Application Priority Data

Feb. 25, 2014 (JP) ................................ 2014-034543
Nov. 19, 2014 (JP) ................................ 2014-234852

(51) Int. Cl.
*F16C 33/78* (2006.01)
*F16C 19/18* (2006.01)
(Continued)

(52) U.S. Cl.
CPC .......... *F16C 33/805* (2013.01); *F16C 19/184* (2013.01); *F16C 33/6618* (2013.01);
(Continued)

(58) Field of Classification Search
CPC    F16C 33/6618; F16C 33/723; F16C 33/7853; F16C 33/7886; F16C 33/805;
(Continued)

(56) References Cited

U.S. PATENT DOCUMENTS 2,849,261 A * 8/1958 Peder Bjerre .......... A01B 23/06
384/460
3,397,933 A    8/1968 Hatcher
(Continued)

FOREIGN PATENT DOCUMENTS

CA    2561083 A1    3/2007
JP    H 8-74868 A    3/1996
(Continued)

OTHER PUBLICATIONS

Search Report dated May 26, 2015, issued by the International Searching Authority in counterpart International Application No. PCT/JP2015/054872 (PCT/ISA/210).
(Continued)

*Primary Examiner* — Alan B Waits
(74) *Attorney, Agent, or Firm* — Sughrue Mion, PLLC

(57) ABSTRACT

A shaft includes a head part having an outer diameter greater than an inner diameter of an inner ring and being in contact with a side surface on one axial end side of the inner ring, and a column part extending from the head part toward the other axial end side and having an axial width greater than a bearing. An external periphery of the other axial end portion of the column part is formed with a male screw to be fastened with a support arm. A side surface on one axial end side of the shaft is formed with a concave section to which a tool capable of rotating the shaft is to be fitted. A bottom part of a housing is formed with a through-hole into which the tool can be inserted, at a position facing the concave section.

16 Claims, 6 Drawing Sheets

(51) Int. Cl.
*F16C 33/80* (2006.01)
*F16C 35/063* (2006.01)
*F16C 35/067* (2006.01)
*F16C 33/72* (2006.01)
*F16C 33/66* (2006.01)

(52) U.S. Cl.
CPC ........ *F16C 33/723* (2013.01); *F16C 33/7853* (2013.01); *F16C 33/7886* (2013.01); *F16C 35/063* (2013.01); *F16C 35/067* (2013.01); *F16C 2310/00* (2013.01)

(58) Field of Classification Search
CPC ...... F16C 19/184; F16C 19/18; F16C 19/182; F16C 19/183; F16C 2310/00; A01B 71/04
See application file for complete search history.

(56) References Cited

U.S. PATENT DOCUMENTS

| | | | |
|---|---|---|---|
| 6,062,734 A | 5/2000 | Bundgart | |
| 6,913,085 B2 * | 7/2005 | Ruckle | A01B 71/04 111/164 |
| 2007/0074879 A1 | 4/2007 | Frasier | |
| 2009/0095495 A1 * | 4/2009 | Spohn | A01B 71/04 172/601 |
| 2013/0011090 A1 | 1/2013 | Shimizu et al. | |

FOREIGN PATENT DOCUMENTS

| | | |
|---|---|---|
| JP | 2002504653 A | 2/2002 |
| JP | 2011256965 A | 12/2011 |

OTHER PUBLICATIONS

Written Opinion dated May 26, 2015, issued by the International Searching Authority in counterpart International Application No. PCT/JP2015/054872 (PCT/ISA/237).

* cited by examiner

BEARING UNIT

TECHNICAL FIELD

The present invention relates to a bearing unit.

BACKGROUND ART

For agriculture uses, mainly in dry-field farming, a disc-type operating machine is used at cultivation and stripe seeding of seeds. Since an operating machine having a cultivation disc is dragged by a towing vehicle such as a tractor, the cultivation disc is correspondingly rotated. At this time, the cultivation disc can perform works of making furrows, making a ridge between fields, and covering soils again after strewing seeds or fertilizer, and the like, for example. Herein, in order to support the rotation of the cultivation disc, a combination of a bearing and a housing, a rolling bearing such as a unitized ball bearing or tapered roller bearing or the like is usually used for one disc.

Since several to tens of discs are used in parallel for one disc-type cultivating machine so as to efficiently perform the works, several to tens of the bearings are also used. In such agriculture uses, the cultivating machine is basically used outdoors (fields) and is used for cultivation. That is, the cultivating machine is used under severe environments where it is exposed to water, mud, sand and the like.

As an example of the background art technology, Patent Document 1 discloses a hub bearing assembly, in which a bearing and a housing having a flange part are fitted with each other, and the flange part and a disc are coupled by a rivet. A hub shaft has a male screw on an outer periphery of a tip thereof, a sleeve has a female screw on an inner periphery thereof, and the hub shaft and the sleeve are screw-fixed. An outer periphery of the sleeve is in contact with an inner periphery of an inner ring of the bearing.

Further, as an example of a seal to be used for agriculture use, a bearing seal disclosed in Patent Document 2 may be exemplified. The bearing seal can be attached to an outer ring by an annular protrusion provided at an elastic member and can be attached to a circumferential groove formed on an inner periphery of an outer ring of the bearing by a snap operation.

PRIOR ART DOCUMENTS

Patent Documents

Patent Document 1: Canadian Patent No. 2,561;083
Patent Document 2: Japanese Patent Application Publication No. 2002-504653A

SUMMARY OF THE INVENTION

Problems to be Solved

However, since the huh bearing assembly of Patent Document 1 has a complicated structure, it takes time to attach and detach the same to and from the operating machine or the like and the manufacturing cost increases.

The hub bearing assembly of Patent Document 1 has an insufficient seal measure at the bearing inside. Therefore, when mud, sand or the like enters the hub bearing assembly, those adhere to the male screw and the female screw, so that the bearing and the disc may not be replaced.

The seal of Patent Document 2 does not consider protection for the seal itself. Hence, when the seal is damaged due to the mud or sand, the sealing performance may be deteriorated and the sufficient dustproof effect may not be achieved.

The present invention has been made in view of the above circumstances, and an object of the present invention is to provide a bearing unit having a relatively simple structure and excellent sealing performance and capable of being easily attached and detached.

Means for Solving the Problems

The above object of the present invention is achieved by following configurations.
(1) A bearing unit comprises:
  a shaft extending axially; and
  a housing disposed at a radially outer side of the shaft via a bearing,
  wherein the housing includes a cylindrical part extending axially and having one axial end portion positioned at one axial end side more than the shaft, a bottom part extending radially inward from the one axial end portion of the cylindrical part, and a flange part extending radially outward from the other axial end portion of the cylindrical part and capable of attaching a cultivation disc thereto,
  wherein the bearing includes an inner ring externally fitted to the shaft, an outer ring internally fitted to the cylindrical part of the housing, and a plurality of rolling elements disposed between a raceway surface of the inner ring and a raceway surface of the outer ring,
  wherein the shaft includes a head part having an outer diameter greater than an inner diameter of the inner ring and being in contact with a side surface on one axial end side of the inner ring and a column part extending from the head part toward the other axial end side and having an axial width greater than the bearing,
  wherein an outer periphery of the other axial end portion of the column part is provided with a fastening part to be fastened with a support member,
  wherein a side surface on the one axial end side of the shaft is formed with a concave portion to which a tool capable of rotating the shaft is to be fitted, and
  wherein the bottom part of the housing is formed with a through-hole into which the tool can be inserted, at a position facing the concave portion.
(2) In the bearing unit according to (1),
  the bearing further includes a pair of seal members fixed to both axial end portions of an inner periphery of the outer ring,
  an inner ring spacer is externally fitted to the shaft at the other axial end side of the inner ring,
  an annular shield plate configured to close an opening between the inner ring and the outer ring is interposed between the inner ring and the inner ring spacer,
  wherein an outer ring spacer is internally fitted to the cylindrical part of the housing to be in contact with the outer ring at the other axial end side of the outer ring, and the cylindrical part of the housing is provided with a concave stop ring groove at the other axial end side of the outer ring spacer, to which a stop ring configured to restrict axial movement of the outer ring spacer is internally fitted, and
  wherein the outer ring spacer includes a circular ring part extending axially and a convex portion extending radially inward from the other axial end portion of the circular ring part.

(3) In the bearing unit according to (1) or (2),
an outer periphery of the other axial end portion of the column part is formed with a male screw to be screwed to a female screw of the support member, and
the concave portion is formed at the head part.
(4) In the bearing unit according to (2),
grease is contained in a space between the seal member and the shield plate.
(5) In the bearing unit according to any one of (1) to (4),
the flange part of the housing is formed with a concave disc attachment groove at the other axial end portion thereof, and
the cultivation disc is attached to the disc attachment groove.
(6) In the bearing unit according to any one of (1) to (5),
when an inner diameter of the through-hole is denoted as Da and an inner diameter of the concave portion is denoted as Db, a relation of Da>Db is satisfied.
(7) In the bearing unit according to (2) or (4),
a first labyrinth gap is formed in an axial space between the shield plate and the convex portion of the outer ring spacer, and
a second labyrinth gap is formed in a radial space between the shield plat and the circular ring part of the outer ring spacer.
(8) In the bearing unit according to (7),
when the first labyrinth gap is denoted as A and the second labyrinth gap is denoted as B, a relation of A>B is satisfied.
(9) In the bearing unit according to any one of (2), (4), (7) and (8),
the shaft is screwed and supported to a female screw of the support member,
the support member is in axial contact with the inner ring spacer and axially overlaps with the stop ring,
a third labyrinth gap is formed in a radial space between the convex portion of the outer ring spacer and the inner ring spacer,
a fourth labyrinth gap is formed in a radial space between the stop ring and the support member,
a fifth labyrinth gap is formed in an axial space between the support member and the convex portion of the outer ring spacer, and
when the third labyrinth gap is denoted as C and the fourth labyrinth gap is denoted as D, a relation of D>C is satisfied.
(10) In the bearing unit according to (7) or (8),
the shield plate includes a first radial part interposed between the inner ring and the inner ring spacer and extending radially outward, an inclined part connected to the first radial part and extending toward the other axial end side as proceeding radially outward, a second radial part connected to the inclined part and extending radially outward, and an axial part connected to the second radial part and extending toward the one axial end side,
the first labyrinth gap is formed in a axial space between the second radial part and the convex portion of the outer ring spacer, and
the second labyrinth gap is formed in a radial space between the axial part and the circular ring part of the outer ring spacer.
(11) In the bearing unit according to any one of (1) to (10),
the through-hole includes a small diameter portion at the one axial end side and a large diameter portion at the other axial end side, which are continuously formed.
a cap member made of an elastic material is detachably fitted in the through-hole from the one axial end side,
the cap member includes a collar part at the one axial end side and an annular part extending axially from the collar part and fitted in the through-hole,
the other axial end of the annular part is formed with a protrusion protruding radially outward, and
when an inner diameter of the through-hole is denoted as Da, an outer diameter of the protrusion is denoted as da and an outer diameter of the collar part is denoted as db, relations of da>Da and db>Da are satisfied.
(12) In the bearing unit according to any one of (2), (4), (7), (8), (9) and (10),
when an axial width of the outer ring spacer is denoted as X, an axial width of the inner ring spacer is denoted as Y, an axial width of the stop ring is denoted as Z and an axial width of the shield plate between the inner ring and the inner ring spacer is denoted as V, relations of X<Y+V and X+Z>Y+V are satisfied.
(13) In the bearing unit according to (12),
an outer periphery of the other axial end portion of the column part is provided with a male screw to be screwed to a female screw of the support member, and
when an axial width of the bearing is denoted as F, an axial width of the column part of the shaft is denoted as L and an axial width of the male screw is denoted as M, a relation of F+Y+V>L−M is satisfied.
(14) In the bearing unit according to any one of (1) to (13),
the bearing is a double-row angular bearing, and
when a contact angle of the rolling element and the outer ring and inner ring is denoted as $\alpha$, a relation of $20°\leq\alpha\leq50°$ is satisfied.
(15) In the bearing unit according to any one of (1) to (14),
when a diameter of the rolling element is denoted as Dw and a section height of the bearing is denoted as H, a relation of $0.20\leq Dw/H\leq 0.50$ is satisfied.
(16) In the bearing unit according to any one of (1) to (15),
when a thickness of the outer ring is denoted as I, a thickness of the inner ring is denoted as J and a section height of the bearing is denoted as H, at least one of a relation of $0.25\leq I/H\leq 0.40$ and a relation of $0.25\leq J/H\leq 0.40$ is satisfied.
(17) A bearing unit comprises:
a shaft extending axially; and
a housing disposed at a radially outer side of the shaft via a bearing,
wherein the housing includes a cylindrical part extending axially and having one axial end portion positioned at one axial end side than the shaft, a bottom part extending radially inward from the one axial end portion of the cylindrical part, and a flange part extending radially outward from the other axial end portion of the cylindrical part and capable of attaching a cultivation disc thereto,
wherein the bearing includes an inner ring externally fitted to the shaft, an outer ring internally fitted to the cylindrical part of the housing, a plurality of rolling elements disposed between a raceway surface of the inner ring and a raceway surface of the outer ring, and a pair of seal members fixed to both axial end portions of an inner periphery of the outer ring,
wherein an inner ring spacer is externally fitted to the shaft at the other axial end side of the inner ring, and
wherein an annular shield plate configured to close an opening between the inner ring and the outer ring is interposed between the inner ring and the inner ring spacer.

(18) In the bearing unit according to (17),
an outer ring spacer is internally fitted to the cylindrical part of the housing to be in contact with the outer ring at the other axial end side of the outer ring, and the cylindrical part of the housing is provided with a concave stop ring groove at the other axial end side of the outer ring spacer, to which a stop ring configured to restrict axial movement of the outer ring spacer is internally fitted, and the outer ring spacer includes a circular ring part extending axially and a convex portion extending radially inward from another axial end portion of the circular ring part.

Effects of the Invention

According to the hearing unit of the present invention, the side surface on one axial end side of the shaft is formed with the concave portion to which the tool capable of rotating the shaft is to be fitted, and the bottom part of the housing is formed with the through-hole into which the tool can be inserted, at the position facing the concave portion. Therefore, the tool can be rotated with being inserted into the through-hole and fitted to the concave portion of the shaft. Thereby, the shaft positioned at the radially inner side of the housing can be fastened to the support member or can be removed from the support member, and the hearing unit can be easily attached and detached to and from the support arm and the like.

Further, unlike the hub bearing assembly of Patent Document 1, since there is no sleeve between the hub shaft and the bearing, the structure is simple and the manufacturing cost can be reduced.

Also, according to the bearing unit of the present invention, since the shield plate is configured to close the opening between the inner ring and the outer ring and to cover the seal member provided for the bearing, the damage of the seal member due to foreign matters can be prevented.

DETAILED DESCRIPTION OF EMBODIMENTS

Figure 1:
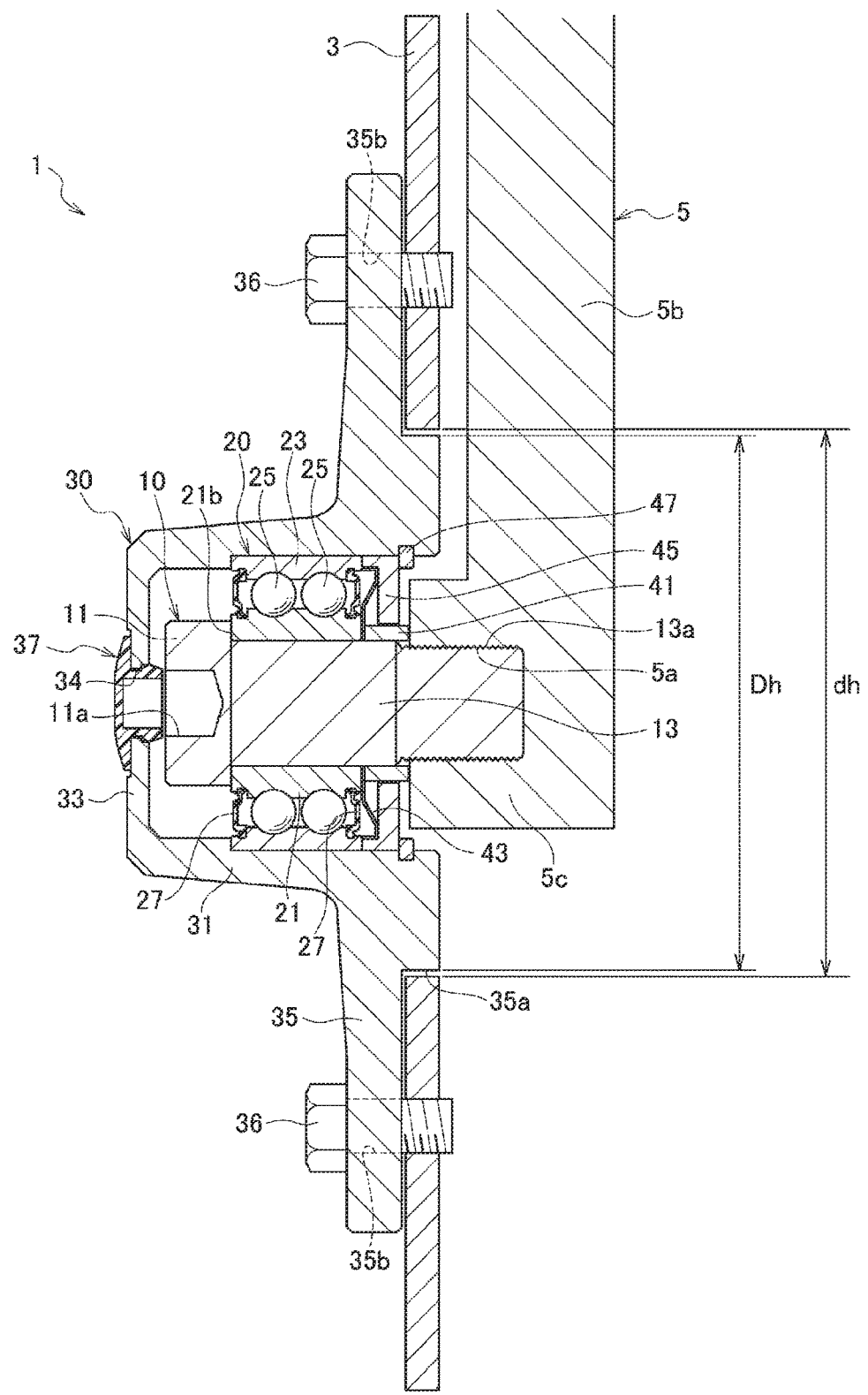
FIG. 1 is a sectional view of a bearing unit according to an embodiment.

Hereinafter, a bearing unit according to an embodiment of the present invention will be described with reference to the drawings.
(First Embodiment)
As shown in FIG. 1, a bearing unit 1 of a first embodiment includes a shaft 10 extending axially and a housing 30 arranged at a radially outer side of the shaft 10 via a bearing 20.

The housing 30 includes a cylindrical part 31 extending axially and having one axial end portion (a left end portion, in FIG. 1) positioned at one axial end side more than the shaft 10, a disc-shaped bottom part 33 extending radially inward from the one axial end portion of the cylindrical part 31, and a flange part 35 extending radially outward from the other axial end portion (a right end portion, in FIG. 1) of the cylindrical part 31 and capable of attaching thereto a cultivation disc 3 to be used for agriculture uses (for example, seeding). The housing 30 is made of an iron-based or aluminum-based material and can be appropriately changed depending on using conditions.

The flange part 35 is provided at the other axial end portion with a concave disc attachment groove 35$a$ and is formed with a plurality of bolt holes 35$b$ penetrating axially. Thereby, when attaching and detaching the cultivation disc 3 to and from the flange part 35, the disc attachment groove 35$a$ serves as a guide, so that it is possible to easily perform the attaching and detaching operations. When an outer diameter of the disc attachment groove 35$a$ is denoted as Dh and an inner diameter of the cultivation disc 3 is denoted as dh, if a relation of Dh<dh is satisfied, the interference between the cultivation disc 3 and the housing 30 is suppressed upon the attaching and detaching operations, so that it is possible to more easily perform the operations. The cultivation disc 3 having a circular ring shape and attached to the disc attachment groove 35$a$ is fastened and fixed to the flange part 35 by bolts 36 screwed into the plurality of bolt holes 35$b$. The number of the bolt holes 35$b$ is preferably two or more, more preferably four or more so as to largely set fastening torques of the bolts 36 and to prevent the cultivation disc 3 from being separated from the flange part 35.

Figure 2:
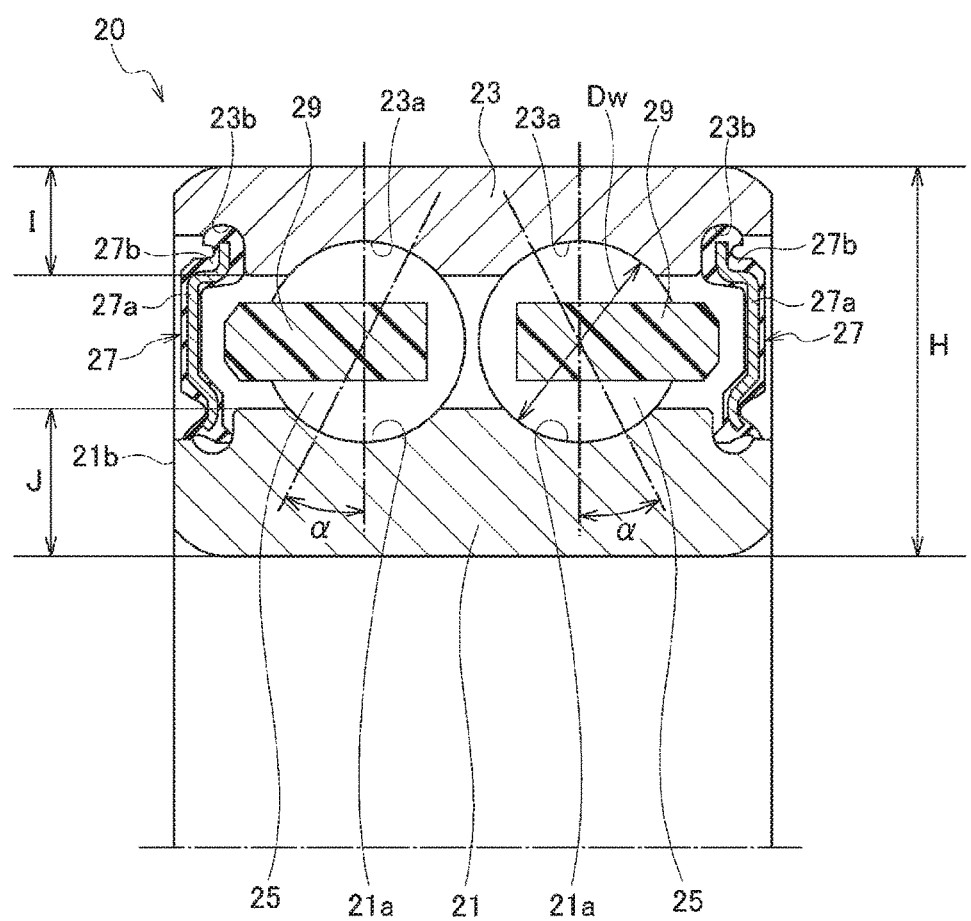
FIG. 2 is a sectional view of a bearing.

As shown in FIG. 2, the bearing 20 is a double-row angular bearing having a seal. Specifically, the bearing 20 includes an inner ring 21 externally fitted to a column part 13 of the shaft 10, an outer ring 23 internally fitted to the cylindrical part 31 of the housing 30, a plurality of balls 25 disposed between raceway surfaces 21$a$ of two rows of the inner ring 21 and raceway surfaces 23$a$ of two rows of the outer ring 23, a pair of seal members 27 fitted and fixed to seal grooves 23$b$ provided at both axial end portions of an inner periphery of the outer ring 23, and a pair of cages 29 configured to hold the balls 2 of two rows in a freely rollable manner.

The cultivation disc 3 is applied with radial and axial loads from the ground at the cultivation. Therefore, the bearing 20 embedded in the bearing unit 1 is applied with the loads via the cultivation disc 3 and the housing 30, and the moment is generated in the bearing 20. Therefore, as shown in FIG. 2, when a contact angle of the ball 25 and the outer ring 23 and inner ring 21 is denoted as $\alpha$, if a relation of $20° \leq \alpha \leq 50°$ is satisfied, the moment rigidity of the bearing 20 is improved, so that it is possible to prevent the bearing 20 from being damaged at the early stage. In order to increase the moment rigidity of the bearing 20, it is efficient to increase the contact angle $\alpha$. However, if the contact angle $\alpha$ is increased without any limit, the load capacity necessary for the bearing 20 is reduced. Therefore, the contact angle $\alpha \leq 50°$ is preferable. Also, $20 \leq \alpha$ is preferable so as to achieve the lifetime extension of the bearing. Further, in order to extend the lifetime of the bearing 20, $25° \leq \alpha \leq .°$ is more effective.

Also, it is necessary to increase the number of the balls 25 of each row as many as possible so as to improve the moment rigidity of the bearing 20. When a diameter of the ball 25 is denoted as Dw and a section height of the bearing 20 is denoted as if a relation of $0.20 \leq Dw/H \leq 0.50$ is satisfied, it is possible to set the number of the balls 25 to an appropriate value. On the other hand, if $0.20 > Dw/H$, the load capacity necessary for the bearing 20 is reduced. Also, if Dw/H>0.50, thicknesses I, J of the outer ring 23 and the inner ring 21 and a thickness of a column part of the cage 29 become thin, so that it is difficult to secure the strengths of the outer ring 23, the inner ring 21 and the cage 29.

The thickness I of the outer ring 23, the thickness J of the inner ring 21 and the section height H of the bearing 20 preferably satisfy at least one of a relation of 0.25≤I/H≤0.40 and a relation of 0.25≤J/H≤0.40, and more preferably satisfy both the relations. If I/H>0.40 or J/H>0.40, the moment rigidity of the outer ring 23 or the inner ring 21 increases but the number of the balls 25 decreases, so that the load capacity necessary for the bearing 20 is reduced. If 0.25>I/H or 0.25>J/H, the thickness I, J of the outer ring 23 or the inner ring 21 become thin, so that it is difficult to secure the strength of the outer ring 23 or the inner ring 21. Therefore, in the first embodiment, the setting is made so as to satisfy at least one of the relation of 0.25≤I/H≤0.40 and the relation of 0.25≤J/H≤0.40, so that the above problems can be solved. On the other hand, when the thickness J of the inner ring 21 is set to be equal to or greater than the thickness I of the outer ring (J≥I), the moment rigidity of the inner ring 21, which is a stationary ring, increases, which is particularly suitable for the agriculture uses, like the first embodiment.

The seal member 27 is configured such that a metallic core bar 27a is covered by an elastic material 27b such as a rubber material. The elastic material 27b is fitted and fixed to the seal groove 23b of the outer ring 23, and extends radially inward to be in sliding contact with the outer periphery of the inner ring 21, thereby securing sealing performance of the bearing 20. In the meantime, as the material of the elastic material 27b, a variety of rubber materials such as acryl-based, nitrile-based and fluorine-based materials are appropriately adopted depending on using conditions of the bearing 20.

As lubricant, grease is contained in the bearing 20, i.e., in a space among the inner ring 21, the outer ring 23 and the pair of seal members 27. In order to increase the lubrication effect of the bearing 20, a grease-contained volume V (containing amount) in the bearing 20 is preferably V≥0.20 W where a static space volume in the bearing 20 is denoted as W.

In the meantime, a type of the bearing 20 is not particularly limited as long as it is a rolling bearing having a seal, For example, a ball bearing having a seal of a single row or a combination of two ball bearings having a seal of a single row may be used. Also, the bearing 20 may be a double-row or single row angular ball bearing or taper roller bearing or a combination of the two ball bearings or taper roller bearings.

Figure 5:
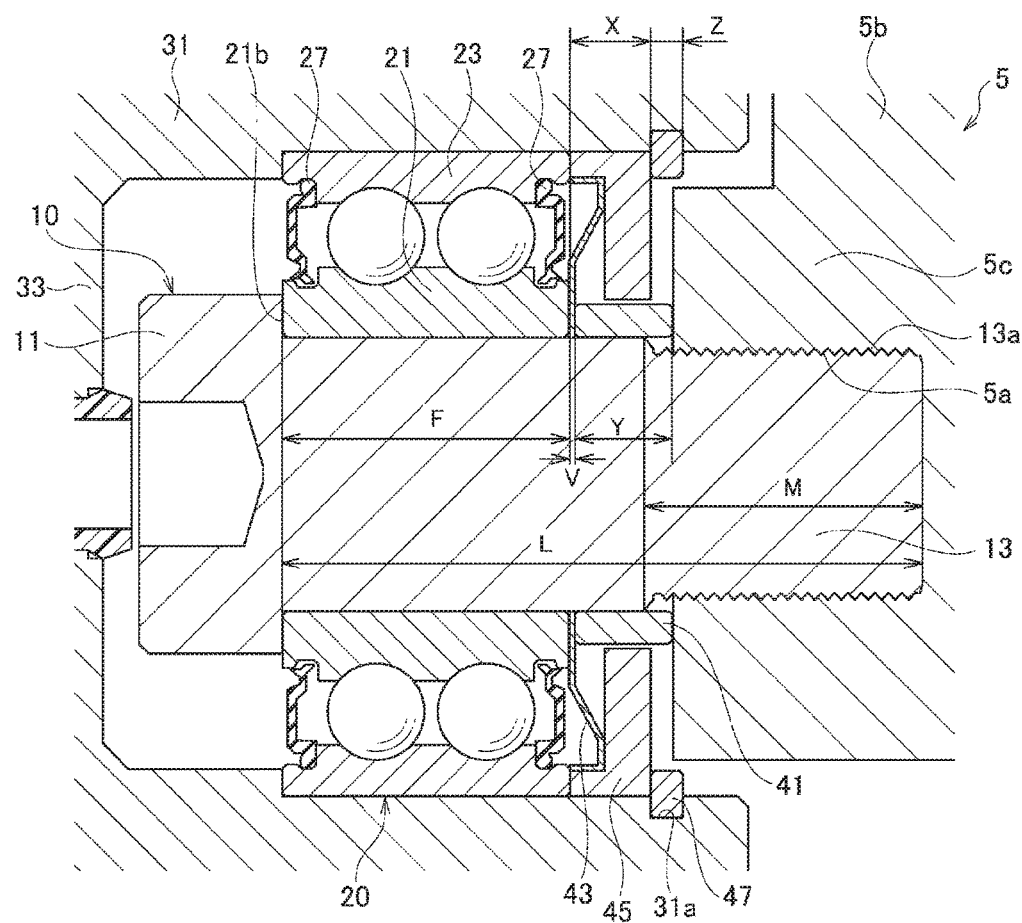
FIG. 5 shows axial sizes of respective members.

Referring to FIG. 5, the shaft 10 includes a disc-shaped head part 11 having an outer diameter greater than an inner diameter of the inner ring 21 and being in contact with a side surface 21b on one axial end of the inner ring 21, and a column part 13 extending from a substantial center of the head part 11 toward the other axial end side and having an axial width L greater than an axial width F of the bearing 20 (the inner ring 21, the outer ring 23) (F<L). The head part 11 is in contact with the side surface 21b on one axial end of the inner ring 21, so that relative axial positions of the shaft 10 and the inner ring 21 are restricted.

An outer diameter of the column part 13 is set to be substantially the same as the inner diameter of the inner ring 21, and the inner ring 21 can be externally fitted to the column part 13. In the meantime, the column part 13 and the inner ring 21 are preferably fitted by clearance fitting. An outer periphery of the other axial end portion of the column part 13 is formed with a male screw 13a (fastening part) over an axial width M, and is screw-fixed to a female screw 5a of a support arm 5 (support member). Incidentally, the fastening between the column part 13 and the support arm 5 is not limited to the fastening by the male screw 13a and the female screw 5a, and any method may also be adopted.

The support arm 5 includes a radially extending arm part 5b and a protrusion 5c protruding from a tip of the arm part 5b toward one axial end side. The protrusion 5c is formed at its center with a concave portion having the female screw 5a such that the column part 13 of the shaft 10 can be screwed thereto.

Figure 3:
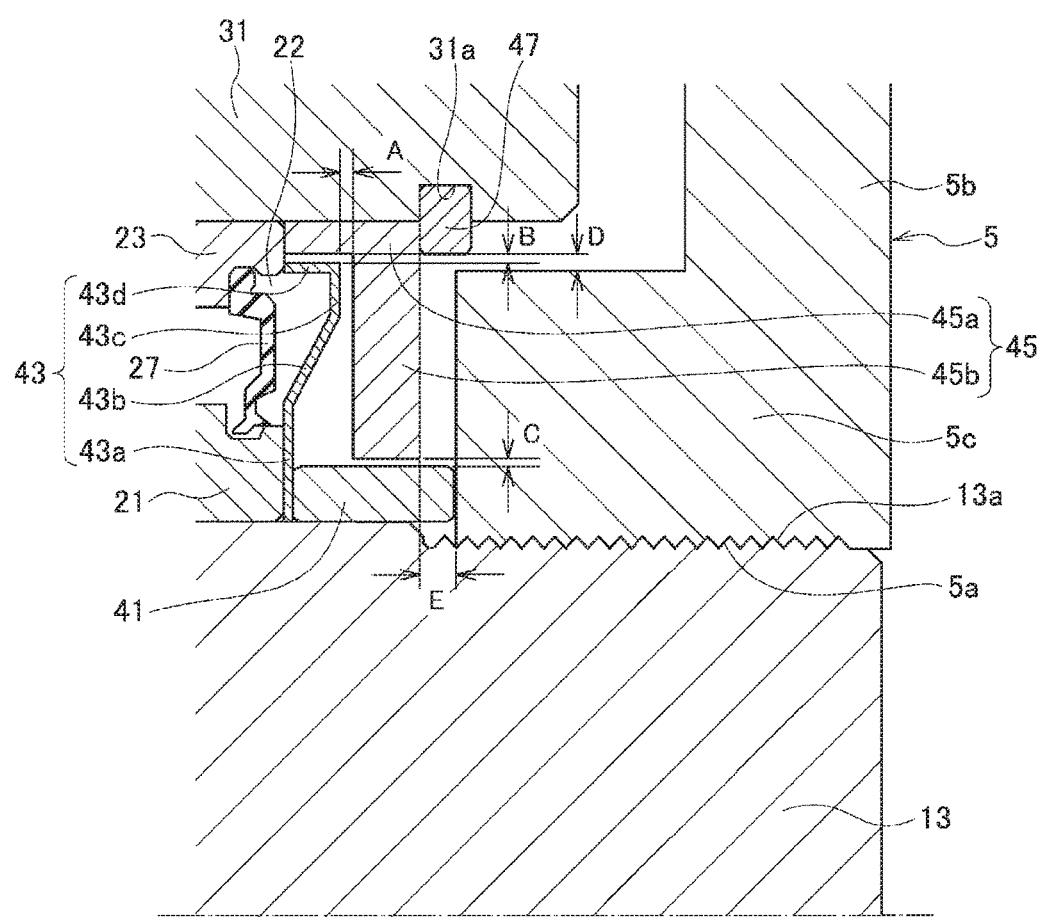
FIG. 3 is a sectional view of a main portion of the bearing unit.

As shown in FIGS. 3 and 5, a circular ring-shaped inner ring spacer 41 is externally fitted to the column part 13 at the other axial end side of the inner ring 21. An annular shield plate 43 configured to close an opening 22 between the inner ring 21 and the outer ring 23 of the bearing 20 is interposed in an axial space between the inner ring 21 and the inner ring spacer 41.

An outer ring spacer 45 having an axial width X is internally fitted to the cylindrical part 31 of the housing 30 to be in contact with the outer ring 23 at the other axial end side of the outer ring 23. Further, the cylindrical part 31 of the housing 30 is provided with a concave stop ring groove 31a at the other axial end side of the outer ring spacer 45, to which an annular stop ring 47 is internally fitted. The stop ring 47 is configured to contact the outer ring spacer 45, to restrict axial movement of the outer ring spacer 45 and to prevent the outer ring spacer 45 and the bearing 20 from separating. An axial width of the stop ring 47 is denoted as Z.

The outer ring spacer 45 is formed to have an L-shaped section including a circular ring part 45a internally fitted to the cylindrical part 31 and extending axially and a convex portion 45b extending radially inward from the other axial end portion of the circular ring part and facing the inner ring spacer 41. According to the outer ring spacer 45 having that shape, it is possible to suppress introduction of foreign matters from an outside by the shield plate 43. Also, since the structure of the outer ring spacer 45 is relatively simple, it is possible to suppress the cost and to protect the shield plate 43.

The shield plate 43 includes a first radial part 43a interposed between the inner ring 21 and the inner ring spacer 41 and extending radially outward, an inclined part 43b connected to the first radial part 43a and extending toward the other axial end side as proceeding radially outward, a second radial part 43c connected to the inclined part 43b and extending radially outward, and an axial part 43d connected to the second radial part 43c, extending toward the one axial end side to contact the outer ring 23.

Incidentally, since the shield plate 43 is made of an iron-based material, it can be easily processed. In the first embodiment, the shield plate 43 is made of spring steel having elasticity. However, the other iron-based material may be also used. Also, a metal or resin material can be used as long as it has flexibility.

A first labyrinth gap A is formed in an axial space between the second radial part 43c and the convex portion 45b of the outer ring spacer 45, a second labyrinth gap B is formed in a radial space between the axial part 43d and the circular ring part 45a of the outer ring spacer 45, and a third labyrinth gap C is formed in a radial space between the convex portion 45b of the outer ring spacer 45 and the inner ring spacer 41.

In this way, the shield plate 43 is configured to close the opening 22 between the inner ring 21 and the outer ring 23 and to cover the seal member 27 provided for the bearing 20. Therefore, it is possible to prevent the seal member 27 from being damaged due to the foreign matters. Also, since the first to third labyrinth gaps A to C are formed by the shield plate 43, the outer ring spacer 45 and the inner ring spacer 41, it is possible to improve the effect of preventing the foreign matters, water and the like from being introduced into the bearing 20. Therefore, it is possible to implement the long lifetime of the bearing 20.

Herein, when sizes of the first and second labyrinth gaps A, B are set to be A>B, even though the foreign matters pass through the third labyrinth gap C and the first labyrinth gap A and are directed toward the second labyrinth gap B, it is possible to make it difficult for the foreign matters to be introduced into the second labyrinth gap B. Also, even when the bearing is exposed to water, it is possible to reduce a flow rate of water passing through the second labyrinth gap B by the setting of A>B. Similarly, when the setting of A>B is made, the labyrinth effect is improved and the waterproof and dustproof effects are further improved. Also, when a radial gap of the bearing 20 is denoted as R, if A>B>R is satisfied, the second labyrinth gap B is considerably reduced, so that it is possible to avoid the contact between the shield plate 43 and the outer ring spacer 45.

Also, a fourth labyrinth gap D is formed in a radial space between the stop ring 47 and the protrusion 5c of the support arm 5, and a fifth labyrinth gap E is formed in an axial space between the protrusion 5c of the support arm 5 and the convex portion 45b of the outer ring spacer 45. Herein, when sizes of the third and fourth labyrinth gaps C, D are set to be D>C, even though the foreign matters pass through the fourth and fifth labyrinth gaps D, E and are directed toward the third labyrinth gap C, it is possible to make it difficult for the foreign matters to be introduced into the third labyrinth gap C. Also, even when the bearing is exposed to water, it is possible to reduce a flow rate of water passing through the third labyrinth gap C by the setting of D>C, Like this, when the setting of D>C is made, the labyrinth effect is improved and the waterproof and dust-proof effects are further improved. Also, when the radial gap of the bearing 20 is denoted as R, if A>C>R, the third labyrinth gap C is considerably reduced, so that it is possible to avoid the contact between the inner ring spacer 41 and the outer ring spacer 45.

The bearing unit I of the first embodiment is used by rotation of the outer ring but the shield plate 43 includes the inclined part 43b. Therefore, even when the foreign matters are moved radially outward by a centrifugal force upon the rotation, the foreign matters are bounced at the inclined part 43b of the shield plate 43. Therefore, the foreign matters are difficult to pass through the first labyrinth gap A between the second radial part 43c and the convex portion 45b of the outer ring spacer 45.

Figure 4:
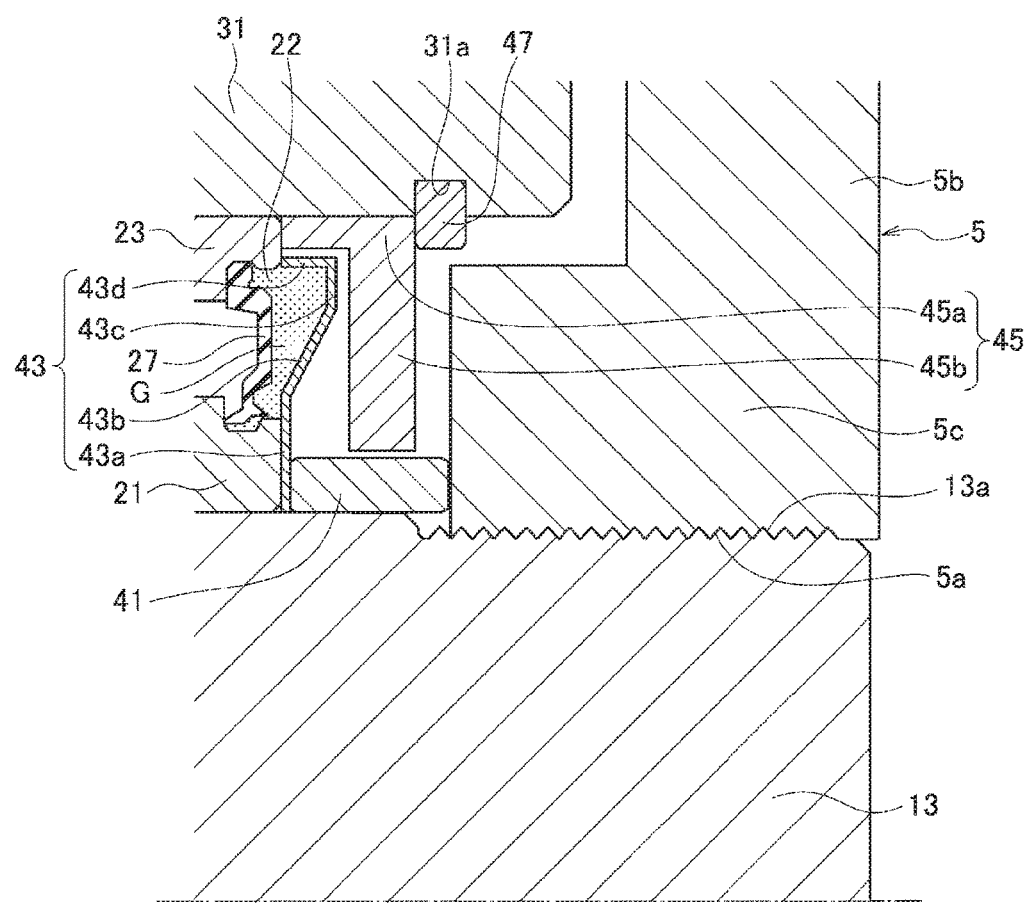
FIG. 4 is a sectional view of a main portion of the bearing unit having grease contained therein.

As shown in FIG. 4, the grease G may be contained in a space between the seal member 27 and the shield plate 43. According to this configuration, even when the foreign matters and the like have passed through the first to third labyrinths A to C, they can be trapped by the grease G, so that it is possible to prevent the damage of the seal member 27. Further, a lubrication state of a sliding contact part between the seal member 27 and the inner ring 21 becomes favorable and the wear of the sliding contact part decreases, so that the lifetime of the seal member 27 is prolonged. In the meantime, the containing amount (containing volume) of the grease G is preferably 90% or greater of a space volume between the seal member 27 and the shield plate 43.

As shown in FIG. 5, the axial width X of the outer ring spacer 45, an axial width Y of the inner ring spacer 41, an axial width Z of the stop ring 47 and an axial width V of the shield plate 43 (first radial part 43a) between the inner ring 21 and the inner ring spacer 41 are set to satisfy relations of X<Y+V and X+Z>Y+V.

By the setting of X<Y+V, when the shaft 10 is screwed to the support arm 5, the inner ring spacer 41 is contacted to the protrusion 5c of the support arm 5 earlier than the outer ring spacer 45. Therefore, in the bearing unit 1 that is to be used by the rotation of the outer ring, it is possible to avoid interference between the outer ring spacer 45 and the support arm 5. In the meantime, in order to avoid interference between the support arm 5 and the other components, the axial width Y of the inner ring spacer 41 may be appropriately adjusted or a separate spacer may be disposed between the inner ring spacer 41 and the protrusion 5c of the support arm 5. Also, since the inner ring spacer 41 is disposed between the inner ring 21 and the support arm 5 in this way, it is possible to easily perform positioning of the bearing 20 and the support arm 5.

By the setting of X<Y+V and X+Z>Y+V, the stop ring 47 and the protrusion 5c of the support arm 5 axially overlap with each other, Therefore, a labyrinth structure including the fourth and fifth labyrinth gaps D, E is made between the stop ring 47 and the convex portion 45b of the outer ring spacer 45 and the protrusion 5c of the support arm 5, so that the waterproof and dustproof effects are further improved. Meanwhile, in order to implement the labyrinth structure, it is necessary to make an inner diameter of the stop ring 47 larger than an outer diameter of the protrusion 5c of the support arm 5.

Further, an axial width F of the bearing 20, an axial width L of the column part 13 of the shaft 10, an axial width M of the male screw 13a, the axial width Y of the inner ring 21, and the axial width V of the shield plate 43 (first radial part 43a) between the inner ring 21 and the inner ring spacer 41 are set to satisfy a relation of F+Y+V>L−M. Thereby, when screwing and attaching the shaft 10 to the support arm 5, it is possible to easily perform the positioning of the bearing 20 without disposing another spacer or the like between the support arm 5 and the inner ring spacer 41. However, if a value of L−M is made smaller beyond necessity, it may not possible to sufficiently support the load of the bearing 20. Therefore, a relation of L−M>F is preferable.

Figure 6:
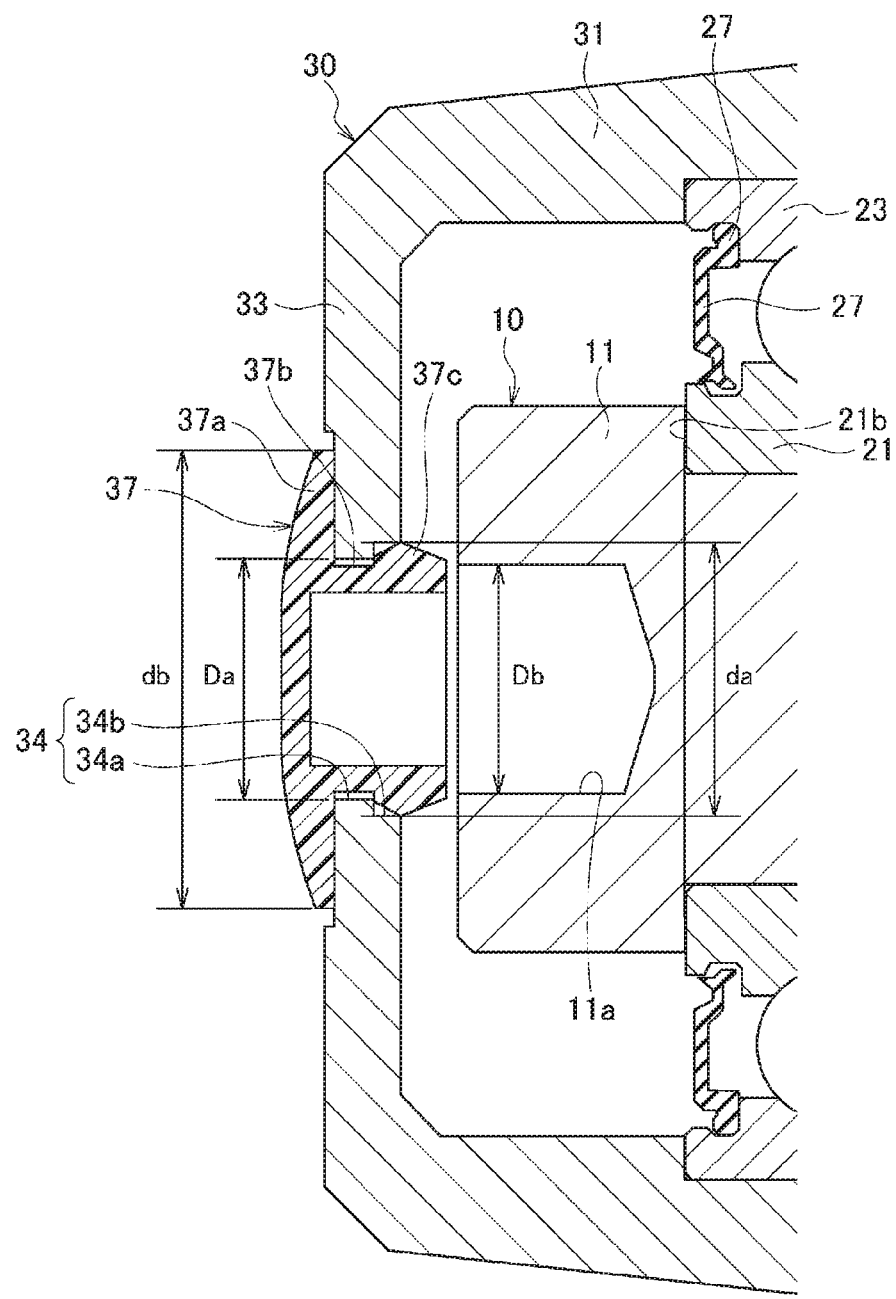
FIG. 6 shows radial sizes of respective members.

As shown in FIGS. 1 and 6, aside surface on one axial end side of the head part 11 of the shaft 10 is formed at its substantial center with a concave portion 11a to which a tool (no(shown) capable of rotating the shaft 10 is to be fitted. In the first embodiment, the concave portion 11a is configured as a hexagonal hole so as to insert therein the tool. However, the concave portion may be appropriately changed into any shape of another tool.

The bottom part 33 of the housing 30 is formed with a through-hole 34 into which the tool can be inserted, at a position axially facing the concave portion 11a of the shaft 10, i.e., at a substantial center. Therefore, the tool can be rotated with being inserted into the through-hole 34 and fitted to the concave portion 11a of the shaft 10. Thereby, it is possible to screw and attach the shaft 10, which is positioned at the axially radially inner side of the housing 30, to the support arm 5 and to remove the same from the support arm 5, so that it is possible to easily attach and detach the bearing unit 1 to and from the support arm 5.

The through-hole 34 includes a small diameter portion 34a at one axial end side and a large diameter portion 34b at the other axial end side, which are continuously formed, When an inner diameter of the small diameter portion 34a of the through-hole 34 is denoted as Da and an inner diameter of the concave portion 11a of the shaft 10 is denoted as Db, a setting of Da>Db is made. Therefore, it is possible to attach and detach the shaft 10 (bearing unit 1) to and from the support arm 5 while preventing the interference between the tool and the housing 30. Further, a setting of Da>Db and Da≈Db is more preferable because a size of the through-hole 34 is made as small as possible and an introduction possibility of grit and dust, waste and the like can be thus reduced.

In the through-hole 34, a cap member 37 made of an elastic material is detachably fined from one axial end side. The cap member 37 is not particularly limited as long as it is made of an easily elastically-deformable material. For example, a resin or rubber material is used. The cap member 37 includes a collar part 37a at one axial end side and an annular part 37b extending axially from a substantial center of the collar part 37a and to be fitted in the through-hole 34. An inside of the annular part 37b is void, so that it can be easily elastically deformable upon the fitting into the through-hole 34. The other axial end of the annular part 37b, specifically, the other axial end side beyond the small diameter portion 34a of the through-hole 34 with the annular part 37b being fitted in the through-hole 34 is formed with a protrusion 37c protruding radially outward. A tip portion of the protrusion 37c includes a tapered outer periphery, so that it is guided and easily deformed by the small diameter portion 34a upon the insertion and fitting into the through-hole 34. Herein, when an outer diameter of the protrusion 37c is denoted as da and an outer diameter of the collar part 37a is denoted as db, a setting of da>Da and db>Da is made with respect to the inner diameter Da of the small diameter portion 34a of the through-hole 34.

In this way, it is possible to improve the waterproof and dustproof effects by the cap member 37 to be detachably fitted into the through-hole 34. That is, when attaching and detaching the bearing unit 1 by using the tool, the cap member 37 is removed from the through-hole 34, and at a usual using state, the cap member 37 is attached to the through-hole 34.

By the setting of da>Da, since the protrusion 37c of the cap member 37 can be engaged to the other axial end side of the small diameter portion 34a of the through-hole 34, it is possible to increase the effect of preventing the foreign matters and water from being introduced from the outside. However, if the outer diameter da of the protrusion 37c is made larger beyond necessity, it is difficult to attach and detach the cap member 37. Therefore, a setting of da<1.2 Da is preferable.

By the setting of db>Da, since the collar part 37a of the cap member 37 can be engaged to the bottom part 33 of the housing 30, it is possible to increase the effect of preventing the foreign matters and water from being introduced from the outside. However, if the outer diameter db of the collar part 37a is made larger beyond necessity, it is difficult to attach and detach the cap member 37. Therefore, a setting of db <2.0 Da is preferable.

In the meantime, the present invention is not limited to the above embodiment and can be appropriately changed and modified.

The present application is based on a Japanese Patent Application No. 2014-034543 filed on Feb. 25, 2014 and a Japanese Patent Application No. 2014-234852 filed on Nov. 19, 2014, which are herein incorporated by reference.

DESCRIPTION OF REFERENCE NUMERALS

1: bearing unit
3: cultivation disc
5: support arm (support member)
5a: female screw
5b: arm part
5c: protrusion
10: shaft
11: head part
11a: concave portion
13: column part
13a: male screw (fastening part)
20: bearing
21: inner ring
21a: raceway surface
21b: side surface on one axial end
22: opening
23: outer ring
23a: raceway surface
23b: seal groove
25: ball (rolling element)
27: seal member
27a: core bar
27b: elastic material
29: cage
30: housing
31: cylindrical part
31a: stop ring groove
33: bottom part
34: through-hole
34a: small diameter portion
34b: large diameter portion
35: flange part
37: cap member
37a: collar part
37b: annular part
37c: protrusion
41: inner ring spacer
43: shield plate
43a: first radial part
43b: inclined part
43c: second radial part
43d: axial part
45: outer ring spacer
45a: circular ring part
45b: convex portion
47: stop ring

The invention claimed is:

1. A bearing unit comprising:
a shaft extending axially; and
a housing disposed at a radially outer side of the shaft via a bearing,
wherein the housing includes a cylindrical part extending axially and having one axial end portion positioned at one axial end side more than the shaft, a bottom part extending radially inward from the one axial end portion of the cylindrical part, and a flange part extending radially outward from another axial end portion of the cylindrical part and capable of attaching a cultivation disc thereto,
wherein the bearing includes an inner ring externally fitted to the shaft, an outer ring internally fitted to the cylindrical part of the housing, and a plurality of rolling elements disposed between a raceway surface of the inner ring and a raceway surface of the outer ring,
wherein the shaft includes a head part having an outer diameter greater than an inner diameter of the inner ring and being in contact with a side surface on one axial end side of the inner ring and a column part extending from the head part toward another axial end side and having an axial width greater than the bearing, wherein an outer periphery of an axial end portion of the column part is provided with a fastening part to be fastened with a support member,
wherein a side surface on one axial end side of the shaft is formed with a concave portion to which a tool capable of rotating the shaft is to be fitted,
wherein the bottom part of the housing is formed with a through-hole into which the tool can be inserted, at a position facing the concave portion;
wherein the bearing further includes a pair of seal members fixed to both axial end portions of an inner periphery of the outer ring,
wherein an inner ring spacer is externally fitted to the shaft at the other axial end side of the inner ring,
wherein a shield plate configured to close an opening between the inner ring and the outer ring is interposed between the inner ring and the inner ring spacer,
wherein an outer ring spacer is internally fitted to the cylindrical part of the housing to be in contact with the outer ring at the outer axial end side of the outer ring, and the cylindrical part of the housing is provided with a concave stop ring groove at the other axial end side of the outer ring spacer, to which a stop ring configured to restrict axial movement of the outer ring spacer is internally fitted, and
wherein the outer ring spacer includes a circular ring part extending axially and a convex portion extending radially inward from the other axial end portion of the circular ring part.

2. The bearing unit according to claim 1,
wherein an outer periphery of the other axial end portion of the column part is formed with a male screw to be screwed to a female screw of the support member, and
wherein the concave portion is formed at the head part.

3. The bearing unit according to claim 1,
wherein grease is contained in a space between at least one of the seal members and the shield plate.

4. The bearing unit according to claim 1,
wherein the flange part of the housing is formed with a disc attachment groove at an axial end portion thereof, and
wherein the cultivation disc is attached to the disc attachment groove.

5. The bearing unit according to claim 1,
wherein an inner diameter of the through-hole is Da,
wherein an inner diameter of the concave portion is Db, and
wherein Da>Db.

6. The bearing unit according to claim 1,
wherein a first labyrinth gap is formed in an axial space between the shield plate and the convex portion of the outer ring spacer, and
wherein a second labyrinth gap is formed in a radial space between the shield plate and the circular ring part of the outer ring spacer.

7. The bearing unit according to claim 6,
wherein the first labyrinth gap is A,
wherein the second labyrinth gap is B, and
wherein A>B.

8. The bearing unit according to claim 6,
wherein the shield plate includes a first radial part interposed between the inner ring and the inner ring spacer and extending radially outward, an inclined part connected to the first radial part and extending toward the other axial end side as proceeding radially outward, a second radial part connected to the inclined part and extending radially outward, and an axial part connected to the second radial part and extending toward the one axial end side,
wherein the first labyrinth gap is formed in a axial space between the second radial part and the convex portion of the outer ring spacer, and
wherein the second labyrinth gap is formed in a radial space between the axial part and the circular ring part of the outer ring spacer.

9. The bearing unit according to claim 1,
wherein the shaft is screwed and supported to a female screw of the support member,
wherein the support member is in axial contact with the inner ring spacer and axially overlaps with the stop ring,
wherein a third labyrinth gap is formed in a radial space between the convex portion of the outer ring spacer and the inner ring spacer,
wherein a fourth labyrinth gap is formed in a radial space between the stop ring and the support member,
wherein a fifth labyrinth gap is formed in an axial space between the support member and the convex portion of the outer ring spacer,
wherein the third labyrinth gap is C,
wherein the fourth labyrinth gap is D, and
wherein D>C.

10. The bearing unit according to claim 1,
wherein the through-hole includes a small diameter portion at the one axial end side and a large diameter portion at the other axial end side, which are continuously formed,
wherein a cap member made of an elastic material is detachably fitted in the through-hole from the one axial end side,
wherein the cap member includes a collar part at the one axial end side and an annular part extending axially from the collar part and fitted in the through-hole,
wherein an axial end of the annular part is formed with a protrusion protruding radially outward,
wherein an inner diameter of the through-hole is Da,
wherein an outer diameter of the protrusion is da,
wherein an outer diameter of the collar part is db, and
wherein da>Da and db>Da.

11. The bearing unit according to claim 1,
wherein an axial width of the outer ring spacer is X,
wherein an axial width of the inner ring spacer is Y,
wherein an axial width of the stop ring is Z,
wherein an axial width of the shield plate between the inner ring and the inner ring spacer is V, and
wherein X<Y+V and X+Z>Y+V.

12. The bearing unit according to claim 11,
wherein an outer periphery of the other axial end portion of the column part is provided with a male screw to be screwed to a female screw of the support member,
wherein an axial width of the bearing is F,
wherein an axial width of the column part of the shaft is L,
wherein an axial width of the male screw is M, and
wherein F+Y+V>L−M.

13. The bearing unit according to claim 1,
wherein the bearing is a double-row angular bearing, and
wherein a contact angle of the rolling element and the outer ring and inner ring is denoted as α, and
wherein 20°≤α≤50°.

14. The bearing unit according to claim 1,
wherein a diameter of the rolling element is Dw,
wherein a section height of the bearing is H, and
wherein $0.20 \leq Dw/H \leq 0.50$.

15. The bearing unit according to claim 1,
wherein a thickness of the outer ring is I,
wherein a thickness of the inner ring is J,
wherein a section height of the bearing is H, and
wherein at least one of $0.25 \leq I/H \leq 0.40$ and $0.25 \leq J/H \leq 0.40$.

16. A bearing unit comprising:
a shaft extending axially; and
a housing disposed at a radially outer side of the shaft via a bearing,
wherein the housing includes a cylindrical part extending axially and having one axial end portion positioned at one axial end side than the shaft, a bottom part extending radially inward from the one axial end portion of the cylindrical part, and a flange part extending radially outward from another axial end portion of the cylindrical part and capable of attaching a cultivation disc thereto,
wherein the bearing includes an inner ring externally fitted to the shaft, an outer ring internally fitted to the cylindrical part of the housing, a plurality of rolling elements disposed between a raceway surface of the inner ring and a raceway surface of the outer ring, and a pair of seal members fixed to both axial end portions of an inner periphery of the outer ring,
wherein an inner ring spacer is externally fitted to the shaft at the other axial end side of the inner ring, and
wherein an annular shield plate configured to close an opening between the inner ring and the outer ring is interposed between the inner ring and the inner ring spacer;
wherein an outer ring spacer is internally fitted to the cylindrical part of the housing to be in contact with the outer ring at the outer axial end side of the outer ring, and the cylindrical part of the housing is provided with a concave stop ring groove at the other axial end side of the outer ring spacer, to which a stop ring configured to restrict axial movement of the outer ring spacer is internally fitted, and
wherein the outer ring spacer includes a circular ring part extending axially and a convex portion extending radially inward from another axial end portion of the circular ring part.

* * * * *